United States Patent [19]

Remmers

[11] Patent Number: 4,957,091
[45] Date of Patent: Sep. 18, 1990

[54] DUAL SCHEDULE IGNITION SYSTEM
[75] Inventor: Gregry M. Remmers, Ingleside, Ill.
[73] Assignee: Outboard Marine Corporation, Waukegan, Ill.
[21] Appl. No.: 315,147
[22] Filed: Feb. 24, 1989

Related U.S. Application Data

[63] Continuation-in-part of Ser. No. 131,457, Dec. 11, 1987, Pat. No. 4,858,585, which is a continuation of Ser. No. 12,336, Feb. 9, 1987, abandoned.
[51] Int. Cl.$^5$ .............................................. F02P 7/00
[52] U.S. Cl. ................................................. 123/602
[58] Field of Search ............... 123/602, 406, 416, 329, 123/340, 334

[56]  References Cited

U.S. PATENT DOCUMENTS

| | | | |
|---|---|---|---|
| 3,464,397 | 9/1969 | Burson | 123/406 |
| 3,573,545 | 4/1971 | Warner | 315/201 CD |
| 3,738,339 | 6/1973 | Huntzinger et al. | 123/602 |
| 3,741,185 | 6/1973 | Swift et al. | 123/602 |
| 3,768,451 | 10/1973 | Okamoto | 123/406 |
| 3,779,218 | 12/1973 | Nambu | 123/406 |
| 3,793,833 | 2/1974 | Van Basshuysen | 123/148 |
| 3,805,759 | 4/1974 | Fitzner | 123/602 |
| 3,813,877 | 6/1974 | Hunt | 60/285 |
| 3,923,023 | 12/1975 | Ito et al. | 123/406 |
| 3,943,896 | 3/1976 | Green et al. | 123/602 |
| 3,952,715 | 4/1976 | Van Siclen, Jr. | 123/602 |
| 4,015,564 | 4/1977 | Fitzner | 123/406 |
| 4,096,843 | 6/1978 | Marsee | 123/179 G |
| 4,104,998 | 8/1978 | Fenn | 123/406 |
| 4,108,131 | 8/1978 | Shibukawa | 123/148 CC |
| 4,133,325 | 1/1979 | West | 123/602 |
| 4,170,207 | 10/1979 | Boyama | 123/406 |
| 4,244,336 | 1/1981 | Fitzner | 123/418 |
| 4,285,315 | 8/1981 | Douaud et al. | 123/425 |
| 4,306,535 | 12/1981 | Fitzner | 123/602 |
| 4,306,536 | 12/1981 | Fitzner | 123/602 |
| 4,309,759 | 1/1982 | Tokuda et al. | 364/431.05 |
| 4,318,387 | 3/1982 | Fitzner | 123/602 |
| 4,324,215 | 4/1982 | Sieja | 123/602 |
| 4,334,509 | 6/1982 | Nash | 123/414 |
| 4,363,304 | 12/1982 | Fritz et al. | 123/418 |
| 4,404,952 | 9/1983 | Fujimoto et al. | 123/602 |
| 4,436,076 | 3/1984 | Piteo | 123/602 |
| 4,446,841 | 5/1984 | Van Siclen, Jr. | 123/602 |
| 4,452,204 | 6/1984 | Matsubara | 123/417 |
| 4,459,951 | 7/1984 | Tobinaga et al. | 123/198 DC |
| 4,485,784 | 12/1984 | Fujii et al. | 123/416 |
| 4,492,197 | 1/1985 | Yamamoto et al. | 123/630 |
| 4,498,438 | 2/1985 | Sato | 123/418 |
| 4,499,875 | 2/1985 | Katayama et al. | 123/416 |
| 4,502,441 | 3/1985 | Katayama et al. | 123/416 |
| 4,502,442 | 3/1985 | Takakuwa et al. | 123/417 |
| 4,503,822 | 3/1985 | Kobayashi et al. | 123/416 |
| 4,516,554 | 5/1985 | Miura et al. | 123/602 |
| 4,519,038 | 5/1985 | Matsui et al. | 364/431.03 |
| 4,520,781 | 6/1985 | Nishida | 123/414 |
| 4,527,522 | 7/1985 | Cerny | 123/416 |
| 4,527,526 | 7/1985 | Adasu | 123/425 |
| 4,562,801 | 1/1986 | Koike | 123/196 S |
| 4,577,609 | 3/1986 | Donohue | 123/602 |
| 4,633,834 | 1/1987 | Takeuchi et al. | 123/424 |

Primary Examiner—Raymond A. Nelli
Attorney, Agent, or Firm—Welsh & Katz, Ltd.

[57]  ABSTRACT

An ignition system for an internal combustion engine, such as an outboard marine engine, which includes an advanced timing schedule, a non-advanced timing schedule, and a circuit for switching between the two schedules or disabling both schedules based upon engine operating conditions. The ignition system includes an optoelectronic time base generator which produces two sets of timing pulses relative to crankshaft position which are non-advanced timing pulses and advanced timing pulses. The time base generator comprises a LED-phototransistor pair and an encoder disk attached to the crankshaft with slots to interrupt the emission path between LED-phototransistor pair. The non-advanced pulses are generated based upon the trailing edge of each slot while the advanced pulses are generated based up the leading edge, wherein the width of the slots indicate the degree of advancement of the advanced schedule over the non-advanced schedule. Both schedules are inhibited based on a high overspeed condition and a low overspeed condition when the engine is overheated, wherein there is a smooth transition between the two conditions.

27 Claims, 5 Drawing Sheets

DUAL SCHEDULE IGNITION SYSTEM

CROSS-REFERENCE TO RELATED APPLICATION

The present application is a continuation-in-part of U.S. Ser. No. 07/131,457 entitled "Electronically Assisted Engine Starting Means," filed on Dec. 11, 1987, now U.S. Pat. No. 4,858,585 by the same inventive entity, which is also commonly assigned and which was a continuation of Ser. No. 12,336, filed Feb. 9, 1987, now abandoned.

FIELD OF THE INVENTION

The present invention pertains generally to an electronic ignition system for an internal combustion engine, such as an outboard marine engine or the like, and is more particularly directed to a dual schedule ignition system having non-advanced and advanced timing schedules with a time base generator for generating two trains of pulses where the first pulse train is advanced a predetermined number of degrees of engine rotation with respect to the second pulse train.

BACKGROUND OF THE INVENTION

Previously, outboard marine engines have often utilized various means for accomplishing easier starting. For example, such engines may engage a "warm-up" lever which manually advances the ignition timing and partially opens the carburetor throttle plates. The function of such arrangement is to increase the idle speed and the air/fuel ratio of the engine when it is started. These conditions allow the engine to start easier and run more smoothly until it has warmed up to its standard operating temperature.

While many other engine ignition systems have utilized various means to selectively advance the ignition timing characteristic during operation, none of these systems has been adapted to selectively change the engine timing characteristic as a function of the temperature of the engine during its warm-up phase, as well as during a predetermined time period regardless of the temperature of the engine, and as a function of the operating speed of the engine, particularly when operated at a relatively high speed.

A multi-variable ignition system for outboard marine engines or the like, which selectively adapts ignition scheduling on this basis is illustrated in the referenced parent application, U.S. patent application Ser. No. 131,457, entitled, "Electronically Assisted Engine Starting Means" by Gregory M. Remmers, which was filed on Dec. 11, 1987, and which is assigned to the assignee of the present invention. The disclosure of Remmers is hereby expressly incorporated by reference herein.

The system of Remmers provides an improved ignition system which utilizes a signal proportional to the speed of the engine and couples such speed signal with other signals representing additional engine operating conditions to selectively modify the ignition timing characteristic of the engine to accomplish the functional operational characteristics of: (1) providing protection against engine damage that may be caused by a runaway speed condition; (2) providing a desirable ignition advance during the warm-up period of the engine; (3) providing a desirable ignition advance during the initial engine start up period, irrespective of the temperature of the engine (i.e., even when the engine is warm as a result of having been previously operated); and (4) providing protection against damage that may be caused by advancing the timing characteristic while operating the engine above a predetermined operating speed.

The system as taught in Remmers, while advantageous in the adjustment of ignition timing in dependence on a variety of engine operating conditions, does not exhibit the most advantageous time base generator or means for distributing the ignition pulses. The time base for that system is derived from two sets of coils, each of which is associated with a particular cylinder and crankshaft position. One set of coils is physically advanced with respect to the other set to generate two sets of timing pulses; one a normal pulse train and the other an advanced pulse train. Magnets on the flywheel or crankshaft fire each coil in succession to generate the two pulse trains, and engine operating conditions are combined to determine which set of pulses is used to ignite the engine.

Such time base generator is simple and easy to use in small engines, but with higher displacement engines two ignition coils per cylinder becomes somewhat more difficult to package. Further, for multiple cylinder engines, those with four or more cylinders, it is desirable to produce a schedule of ignition advance based on a plurality of engine operating conditions, most typically, one that varies with throttle position. This scheduling is difficult to accomplish with a dual ignition coil time base generator.

Moreover, in Remmers, when inhibiting ignition pulses relative to overspeed and overheated engine conditions, an overspeed threshold is switched immediately from one level to another level when an overheated condition occurs. For small displacement outboard marine engines, an overheated engine condition many times results when the engine is under considerable load, usually pushing a boat along at a high rate of speed. Inhibiting the ignition pulses without any transition between the threshold levels under these conditions can cause a rapid and disconcerting deceleration. Therefore, it would be advantageous to provide a slower transition between the threshold levels so that, if an overheated condition occurs during such a high load condition, a slower and more acceptable deceleration will occur.

SUMMARY OF THE INVENTION

Accordingly, it is an object of the invention to provide an improved electronic ignition system for an internal combustion engine.

Another object of the invention is to provide an improved ignition system, which includes an advanced timing schedule, a non-advanced timing schedule and a circuit for switching between the two schedules, or disabling both schedules, based upon different combinations of engine operating conditions.

Yet another object of the invention is to provide a time base generator for an ignition system which has an optical encoder rotating synchronously with crankshaft position and generating pulses based upon physical timing sections the encoder, wherein the width of a timing section is determinative of an ignition advance.

Still another object of the invention is to provide an improved ignition system which disables the ignition schedules based on a high overspeed condition and a low overspeed condition when the engine is overheated, wherein there is a smooth transition between the two conditions.

Accordingly, the invention provides an improved ignition system for internal combustion engines, such as outboard marine engines, or the like. The ignition system includes a time base generator for providing a first train of pulses advanced in time from a second train of pulses. Each train of pulses is variable according to a schedule with respect to various engine operating parameters, most particularly throttle position.

The time base generator operates by rotating an encoder disk with timing sections past an illumination source which is optically coupled to a photo-sensitive element. The timing sections are positioned on the disk such that each section is a predetermined number of degrees of engine rotation in duration. A digital waveform is generated indicating the presence or absence of a particular section and two pulses trains are derived from the waveform, where the first is indicative of the leading edge of the section and the second is indicative of the trailing edge of the section.

When the encoder disk is rotated in synchronism with the engine crankshaft, two trains of pulses forming a time base are generated where one pulse train is advanced over the second pulse train by the duration or width of each timing section. The timing of the pulse trains relative to actual crankshaft position is varied by movement of the illumination source and photo-sensitive element relative to the encoder disk and is scheduled based upon various engine operating parameters.

The first train of pulses provides an advanced ignition timing schedule while the second train of pulses provides a non-advanced ignition timing schedule. An electrical pulse generator and distributor receives the two pulse trains and selects between the two based upon receiving an advance signal or a non-advanced signal. Alternatively, both schedules are inhibited by an inhibit signal. The selected pulse schedule is distributed to the correct cylinders in the firing sequence of the engine to ignite the engine.

A control circuit generates the advance non-advanced and inhibit signals based upon time, engine temperature, and starting condition. Preferably, the advance signal is generated during the starting of the engine and for a short predetermined period thereafter. If the engine is not then operating above a warm-up temperature, the advance signal is continued until this condition occurs. Regardless of the warm-up status and time of running, if the engine is being operated in excess of a first engine speed, the non-advanced signal is generated. In addition, if a third engine speed is exceeded, the inhibit signal is generated disabling ignition pulses from both schedules. The inhibit signal is also generated if the engine exceeds a second speed and an overheated engine temperature exists. The first speed is, in general, lower than the second speed, which is lower than the third speed. The overheat temperature is, in general, higher than the warm-up temperature.

In a preferred embodiment, the inhibit signal for engine overspeed is generated from a comparator circuit which compares an engine speed signal against an overspeed threshold. The overspeed threshold is smoothly lowered to a lower overspeed threshold when an overheated condition of the engine occurs, thus preventing rapid deceleration. A threshold generating means is utilized to produce the thresholds and is implemented by a voltage divider which provides a first threshold voltage which is representative of a high overspeed condition, for example, approximately 6,700 RPM. The voltage divider is shunted by an optically coupled device upon closure of a temperature sensor in the engine to produce a second threshold voltage representative of a low overspeed condition, for example, approximately 2500 RPM. A delay means, comprising a capacitor, is coupled to the output of the threshold generating means and is generally charged to the first threshold. When the temperature sensor operates, for example at approximately 212° F., a discharge path through the optically coupled device is provided which produces a smooth relatively long decay of the first threshold voltage to the second threshold voltage. A rapid charging path for the delay means is provided to ensure that, when the engine is turned off and then immediately restarted, the delay feature is present. The rapid charging path is disabled by another optically coupled device upon operation of the temperature sensor.

BRIEF DESCRIPTION OF THE DRAWINGS

These and other objects, features, and aspects of the invention will be better understood and more fully described upon reading the following detailed description in conjunction with the appended drawings wherein.

DETAILED DESCRIPTION OF THE PREFERRED EMBODIMENT

Figure 1:
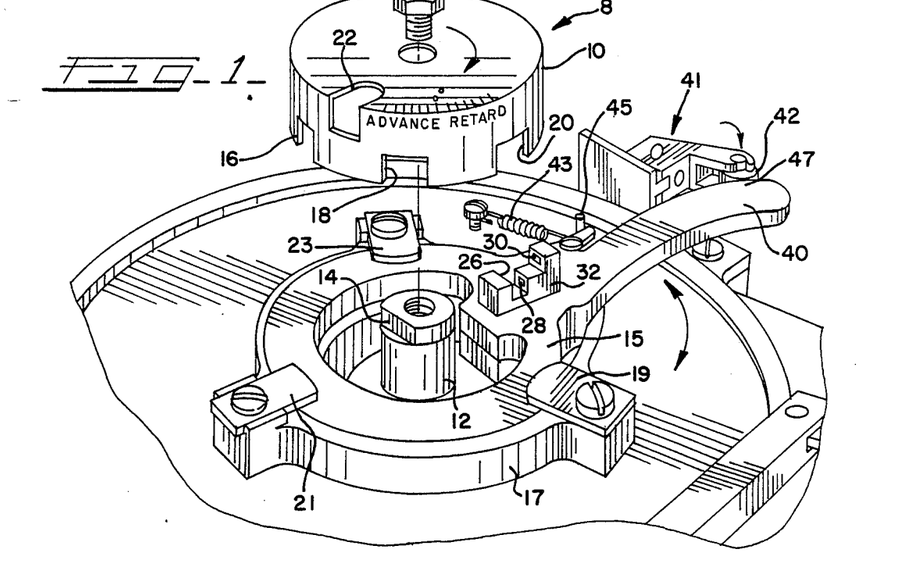
FIG. 1 is a partially-broken, pictorial perspective view of an internal combustion engine of the outboard marine type illustrating a time base generator constructed in accordance with the invention.

The time base generator 8 of the invention is shown to advantage in FIG. 1 where the mechanism for the generation of two timing characteristics or pulse trains is illustrated. The time base generator 8 includes a generally cylindrically shaped encoder disk 10 which is bolted onto a shaft extension 12 of the crankshaft of an internal combustion engine so as to cause the disk to rotate synchronously therewith. The crankshaft extension 12 includes a notch 14 which is received in a reciprocally shaped hub 13 of the encoder disk 10. The notch 14 positions the encoder disk 10 and those timing sections included thereon at a known crankshaft position, i.e., at an angle relative to top dead center of a particular cylinder, for example, cylinder 1. To assist in timing the engine, this reference point 0° can be inscribed on the encoder disk 10 so that it can be aligned with a stationary mark on the engine casing by the common strobe light technique. Rotation of the crankshaft is clockwise when viewed from the top (front) of the engine, as is conventional with most internal combustion engines.

The encoding disk 10 has an encoding portion with several timing sections located at spaced positions around its periphery. The timing sections in the illustrated implementation are provided as slots 16, 18 and 20, although many other geometries would suffice. In the preferred embodiment, the number of slots is equal to the number of cylinders of the engine and they are equally spaced around the periphery of the encoder disk 10. For a six-cylinder, two cycle engine this means six equally spaced slots at 60° intervals. It is evident that for a six-cylinder, four cycle engine, the slots would be spaced at 120° intervals and there would be three in number.

Each of the slots 16, 18 and 20 has a width which is a particular angular rotation of the crankshaft, in the preferred implementation, 15°. The encoder disk 10 further includes a synchronizing portion having a timing section, slot 22, to indicate the relative position of the disk 10 with respect to overall crankshaft position, thus associating each slot 16, 18, and 20 with a particular cylinder. In the illustration, slot 22 is placed in advance of cylinder 1 top dead center and slots 16, 18, and 20 correspond to cylinders 6, 1 and 2, respectively.

Figure 2:
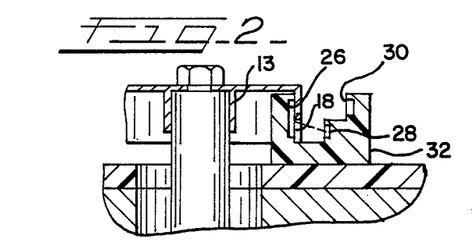
FIG. 2 is a cross-sectional view of a first position of the time base generator illustrated in FIG. 1 taken along section line 2—2 of that figure.
Figure 3:
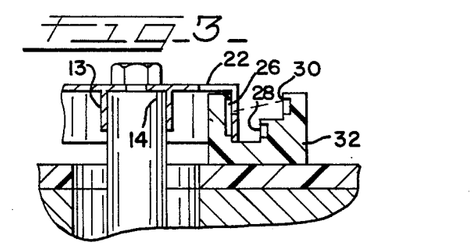
FIG. 3 is a cross-sectional view of a second position of the time base generator illustrated in FIG. 1 taken along section line 2-3 of that figure.

As better shown in FIGS. 2 and 3, the timing sections of the encoder disk 10 make and break the optical illumination path between an LED 26 and two phototransistors 28 and 30 which are mounted in an optical coupler block 32. The optical-coupler block 32 is mounted on a timing ring 15 which slidably rotates on the shoulder of a raised boss 17 of the engine. Spring clips 19, 21, 23 retain the ring 15 in the boss 17 without preventing its rotation. An extension arm 40 of the timing ring 15 is used to rotate the ring 15 and thus optical-coupler block 32 with respect to the fixed relationship of the encoder disk 10 and the crankshaft.

Normally, the ring 15 is biased to a setable position by spring 43 where it abuts an adjustable stop 45. An ignition advance assembly 41 including a roller 42 can be used to apply force against a cam surface 47 of the arm 40 in order to rotate the optical-coupler block 32 in dependence upon a plurality of engine operating conditions to schedule ignition timing. Such engine operating conditions could be such things as speed, airflow, water or engine temperature, humidity, manifold pressure, altitude, throttle position, etc.

From FIG. 2, it should be evident that during the rotation of the encoder disk 10 by the crankshaft, illuminating radiation from the LED 26 to the phototransistor 28 is normally blocked until a slot, for example, the one indicated as 18, rotates between the LED 26 and the phototransistor 28. At this time, the optical transmission path is open, and the phototransistor 28 conducts current producing an electrical signal indicating the presence of the slot. During this time the optical transmission path to the upper phototransistor 30 is blocked by the encoder casing. However, during those times when the slot 22 rotates into a position between the LED 26 and the phototransistor 30 as shown in FIG. 3, the open transmission path causes phototransistor 30 to conduct current and produce an electrical signal indicating the presence of the synchronizing slot 22 at the position of the optical-coupler block 32.

Figure 4:
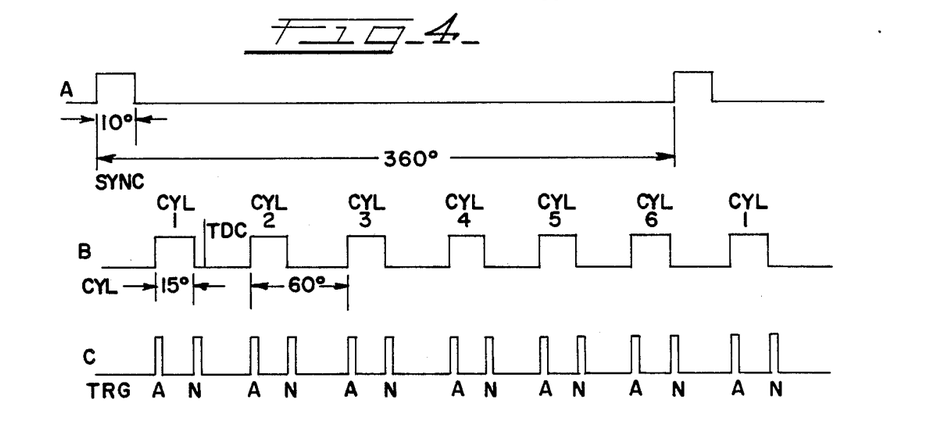
FIG. 4 (parts A, B & C) is a pictorial representation of various waveforms output from the time base generator illustrated in FIG. 1 and the pulse generator and distributor illustrated in FIG. 5.

In general, the timing signals generated from the time base generator are shown in FIG. 4. The first signal is a SYNCH signal (FIG. 4A) from slot 22 which is approximately 10° in duration and occurs once for every 360° of engine crankshaft rotation. The leading edge of the SYNCH signal occurs some advancement before top dead center of a particular cylinder, in the illustrated example, cylinder 1. From this leading edge reference point, all other timing pulses and signals for the system can be measured. In general, the SYNC signal is used to reset the distribution sequence of the ignition pulses. The second timing signal CYL is a group of pulses forming a digital waveform which is generated from the encoder slots 16, 18, 20, etc. (shown in FIG. 4B). There is a pulse, CYL1-CYL6, respectively, for each cylinder of the engine. The pulses are 15° of engine rotation in duration and separated by equal angular increments of the crankshaft at 60° intervals.

From the pulses of FIG. 4B, two sets of ignition pulses are generated by the pulse generator and distributor 70 as shown in FIG. 4C. The leading edge of each cylinder pulse, CYL1-CYL6, is used to generate one train of advanced pulses A, and the trailing edge of each cylinder pulse is used to generate a second train of non-advanced pulses N. The advanced pulse train A is used in an advanced timing schedule and the non-advanced pulse train N is used for a non-advanced timing schedule as will be more fully described hereinafter.

In the preferred embodiment, the non-advanced pulses at idle are at top dead center of each associated cylinder, while the advanced pulses are advanced over the non-advanced pulses a predetermined angular increment, 15°. It is seen that the width of the encoder slots 16, 18 and 20 determines the predetermined advancement of the advanced schedule over the non-advanced schedule. Further, the position of the optical coupler block 32 relative to the fixed relationship of the encoder disk 10 and crankshaft determines the variance of timing with respect to engine operating variables and, thus the actual timing schedule.

Figure 5:
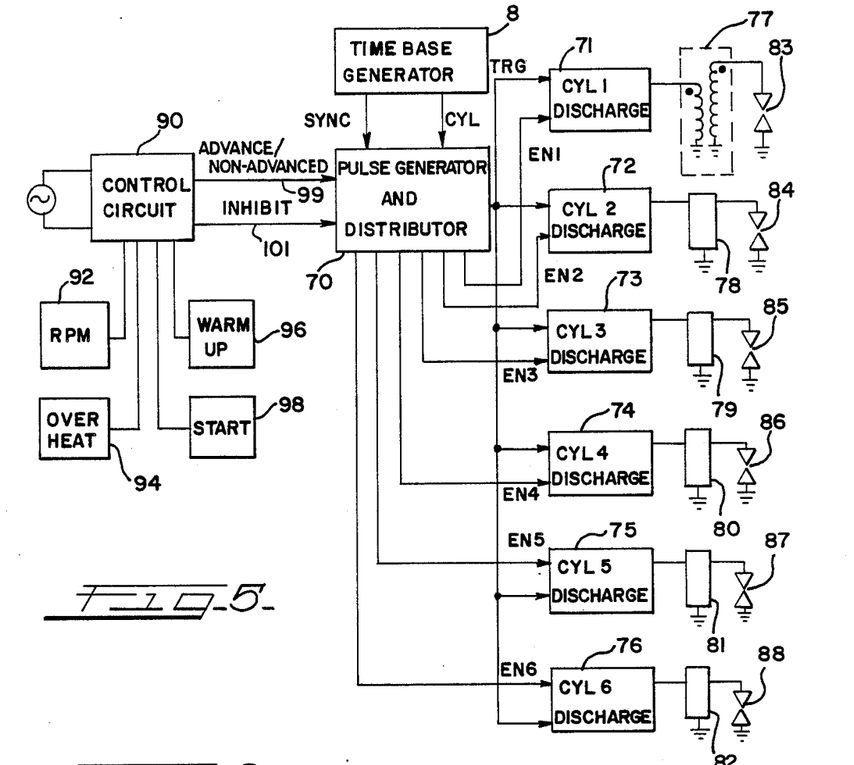
FIG. 5 is system block diagram of an ignition system constructed in accordance with the invention.

An improved ignition system using the time base generator 8 illustrated in FIGS. 1-4 is more fully shown in the block diagram with reference to FIG. 5. The ignition system includes a pulse generator and distributor 70 which produces a trigger pulses TRG to a number of capacitive discharge circuits 71-76, wherein each capacitive discharge circuit is associated with a particular cylinder. When enabled from the pulse generator and distributor 70 by individual enable lines EN1-EN6, a trigger pulse TRG will cause a capacitive discharge circuit 71-76 to provide a high current, low voltage pulse of approximately 300 V through the primary of a step-up transformer 77-82, respectively. The step-up transformers 77-82 step up the voltage of the current pulses from the capacitive discharge circuits into high tension pulses which fire spark plugs 83-88, respectively, of associated cylinders of the engine. The spark plugs 83-88 are ignited sequentially in the firing order of the engine by their respective connection in that order relative to the sequence of firings of the capacitive discharge circuits.

The time base generator 89 is shown generating the pulse trains SYNC and CYL to the pulse generator and distributor 70, which are the signals as shown in FIGS. 4A and 4B. The trigger pulses TRG which are derived from these signal by the pulse generator and distributor 70 are those as shown in FIG. 4C. They are distributed by generating the enable signals EN1-EN6 based on crankshaft position and the firing order of the engine. Whether the trigger pulses TRG are the advanced schedule A or the non-advanced schedule N, depends upon a control circuit 90.

The control circuit 90 determines from the engine operating conditions including means for sensing RPM 92, means for sensing an overheat condition 94, means for sensing a warm up condition 96, and means for sensing a starting condition 98 whether the advanced timing schedule, the non-advanced timing schedule, or no timing schedule should be used. This selection information is delivered to the pulse generator and distributor 70 via an ADVANCE/NON-ADVANCED signal on line 99. Alternatively, the control circuit 90 generates an INHIBIT signal on line 101 to completely stop any ignition pulses from being generated to the engine.

Figure 6:
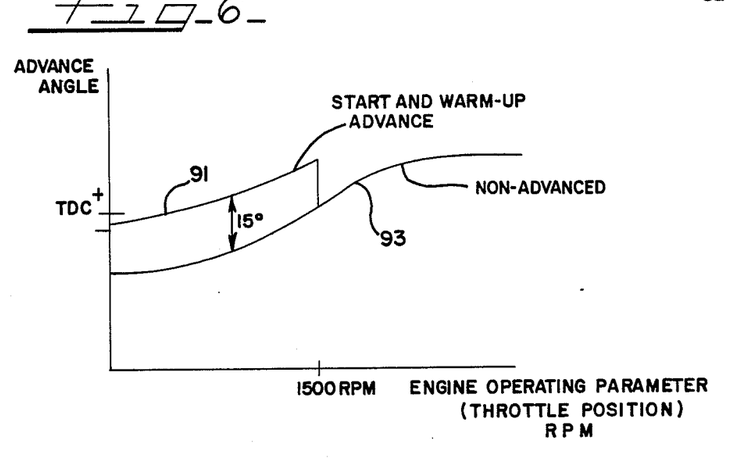
FIG. 6 is a graphical representation of the dual ignition schedules as a function of a plurality of engine operating parameters for the system illustrated in FIG. 5.

FIG. 6 is a graphical representation of the advanced timing schedule 91 and the non-advanced timing schedule 93 illustrating an +advance angle before top dead center (TDC) as a function of an engine operating parameter, or combination of parameters. In the preferred embodiment, the schedules are a similar function of throttle position. While more complex schedules can be used, outboard marine engines advantageously advance ignition timing based on throttle position.

The advanced timing schedule 91 is used during starting and warm up durations, while the non-advanced timing schedule 93 is used at all other times, except in those instances when both ignition schedules are inhibited. It is seen that there is always a +15°0 advance between the advanced schedule and the non-advanced schedule which is dependent upon the spacing between pulse trains A and N from the time base generator 8. The spacing between the pulses is due to the slot widths of the optical encoder disk 10. The variation in advance angle as a function of engine operating parameters (schedule) is developed by the rotation of the optical-coupler block 32 relative to the fixed position of the optical encoder disk 10 on the crankshaft. The functions or schedules shown in FIG. 6 are generally same for the advanced timing schedule and the non-advanced timing schedule and monotonically increase with increase in throttle position. However, these can be very complex schedules depending upon the shape of the cam surface which displaces the arm 40 to cause the rotation of the timing ring 15 and the relative movement of the optical-coupler block 32 with respect to the encoder disk 10.

Figure 7:
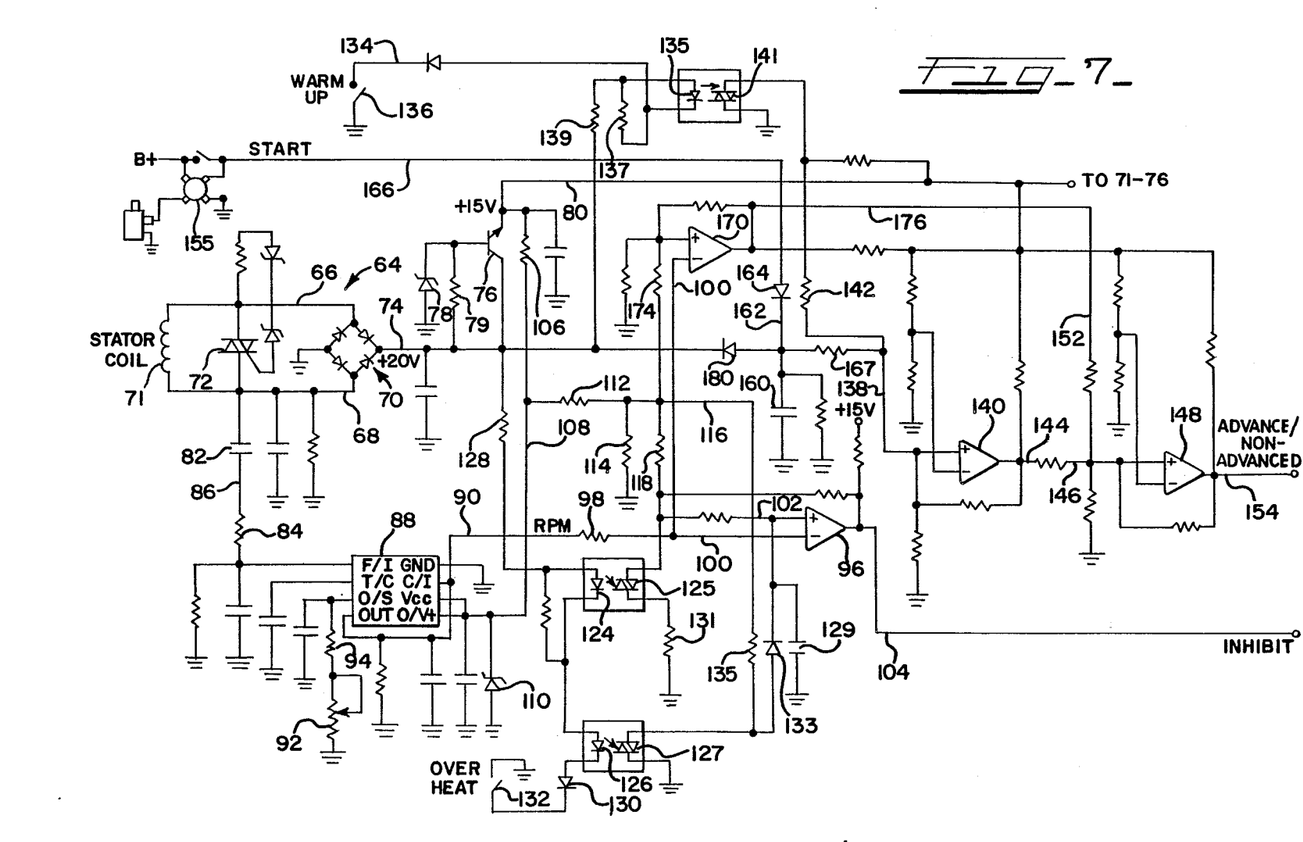
FIG. 7 is a detailed electrical schematic diagram of the control circuit illustrated in FIG. 5.

The control circuit 90 will now be more fully described with respect to the detailed electrical schematic of FIG. 7. The power supply of the present ignition system, indicated generally at 64, includes lines 66 and 68 which are connected to a stator coil 71 of an alternator and to a full-wave rectifier bridge 70. Several magnets on the engine flywheel (not shown) induce a voltage in the stator coil 71 as the flywheel turns, which voltage is rectified by the bridge 70. Overvoltage protection is provided by the connection of a triad 72 between lines 66 and 68. The power supply 64 generally provides approximately a +20V output on line 74. The +20V output is further regulated by NPN transistor 76 having a Zener diode 78 and bias resistor 79 connected to its base. The transistor 76 provides a +15V regulated supply on line 80. This +15 volt regulated supply line 80 is additionally coupled to the power supply line of the capacitive discharge circuits 71–76.

The stator coil 71 produces six pulses for every revolution of the flywheel and thereby provides tachometer pulses on line 86 which are coupled through a capacitor 82 and resistor 84 to the frequency input (F/I) of a frequency to voltage converter 88. The frequency to voltage converter 88 has an output OUT which generates a voltage level on line 90 that is directly proportional to the frequency of the pulses, and hence RPM of the engine. A variable resistor 92 and a fixed resistor 94 define a voltage divider that is adjustable to vary the level of the output voltage produced on the output line 90 for a particular RPM.

One feature of the control circuit 90 provides protection against a runaway speed condition occurring during operation of the engine. This is accomplished by utilizing the voltage level generated by converter 88 on line 90 to inhibit the ignition pulses. The voltage on line 90 is connected to the inverting input of a comparator 96 through resistor 98 and line 100. The noninverting input of the comparator 96 receives a reference voltage on line 102 against which the voltage on line 100 is compared. The output line 104 of the comparator 96 makes a transition to a low logic level (approximately 0 volts) when the voltage on the input line 100 is greater than the reference Voltage on line 102.

For an operating condition that does not represent an overheated condition of the engine, the voltage level on line 102 is designed to be approximately +5 volts. The +5 volts on line 102 is supplied by the power supply from line 80 through voltage dividing circuitry. Line 80 is connected through a resistor 106 to a line 108 that is connected to a Zener diode 110 to provide a regulated voltage of approximately +9V on line 108. Line 108 is connected to resistors 112 and 114 which function as a voltage divider to provide a voltage of approximately +5 volts on a line 116. The line 116 is connected to the line 102 through a resistor 118 and applies the reference +5V to the noninverting input of the comparator 96. A low logic level on line 104 is inverted by an invertor 105 (FIG. 8) to produce a high logic level disabling signal, the INHIBIT signal, to the pulse generator and distributor circuit 70.

During operation, the converter 88 produces a voltage on the output line 90 which is supplied to the inverting input of comparator 96. When the speed reaches approximately 6,700 RPM, the comparator 96, after comparing 3 the voltage output to the reference voltage of approximately +5V, produces a low logic level on the output line 104 that results in the disabling INHIBIT signal. Protection against a runaway speed condition is thereby provided by a relatively few number of circuit components.

It should be understood that the disabling of the ignition pulses may occur for an incrementally short period of time and on a cyclic basis. If the speed is close to the over speed condition, as soon as an overspeed condition is detected, the inhibiting will occur and the speed will quickly drop because of the lack of ignition pulses. When the operating speed falls below the threshold, the INHIBIT signal will be switched off and the ignition pulses will no longer be disabled. Thus, as a practical matter, the engine speed may be modulated around the threshold speed that triggers the comparator 96.

In accordance with another aspect of the control circuit 90, the maximum speed of operation is reduced from approximately 6,700 RPM to approximately 2,500 RPM when an overheated engine condition is detected. This is accomplished using the same comparator 96 in combination with temperature sensing circuitry for the engine. In this regard, light emitting diodes (LEDs) 124 and 126 are optically coupled to phototriacs 125 and 127, respectively. The LEDs 124 and 126 are connected to the +20V supply on line 74 through resistor 128, and to ground through a diode 130 and an overheat temperature switch 132. The overheat temperature switch 132 is a bimetallic switch positioned in the head of the engine to sense the engine temperature. The switch 132 is adapted to close at a temperature of approximately 212° F., and when closed provides a conduction path through LEDs 124 and 126 placing the phototriacs 125 and 127 into conduction.

This operation lowers the reference voltage applied to the noninverting input of the comparator 96 to approximately 2.0V. The lower reference voltage results in the INHIBIT signal being produced on line 104 at a lower operating speed, as is intended. In operation, when an 3 overheated condition is detected, the comparator 96 switches to a low logic level at an operating speed of about 2,500 RPM and disables the ignition pulses to limit the speed as previously described. The speed limiting, however, takes place at a lower speed limit of 2,500 RPM rather than the upper speed limit of 6,700 RPM.

The nature of the phototriac 125 is such that it will not be turned off until power is removed from the circuit, which will not occur until the engine is turned off. This feature is desirable in that it prevents the circuitry from cycling on and off at or about the critical overheat temperature. However, to prevent an abrupt change in the overspeed threshold when the overheat switch 132 closes, there is provided a capacitor 129 connected to the noninverting input of comparator 96. Normally, the capacitor 129 is charged up to the upper threshold voltage of +5V. When an overheat condition occurs, the capacitor 129 gradually discharges through phototriac 125 and resistor 131 to ground. Preferably, the discharge path lowers the voltage at a predetermined rate which is exponential in the illustration, but which could be any function of time, for example, linear. The time constant of the discharge path is long enough, about 4-10 secs., to produce a smooth transition between the upper and lower threshold speed limits and, as a consequence, a gradual deceleration of a boat or other water vehicle powered by the engine. The capacitor 129 is charged rapidly to the upper threshold voltage at start-up by a resistor 135 and diode 133. This current path is shunted to ground and disabled by phototriac 127 during an overheat condition.

Another attribute of the present control circuit 90 includes the provision of automatically providing an advanced timing schedule or advanced ignition characteristic when the engine is initially started and until the engine reaches a predetermined minimum warm up temperature, unless a specific engine RPM is exceeded. With respect to the warm-up aspect of the circuit operation, a line 134 is connected through a warm-up 3 switch 136 to ground. The switch 136, which is a bimetallic sensor, closes when the sensed engine temperature exceeds a warm up temperature, within the range of about 90° F. to 100° F. The line 134 is normally high (open) but makes a transition to a low logic level (ground) when the engine warms up sufficiently to close the switch 136. The line 134 is connected to the +20V supply through an LED 135 and resistors 137 and 139. The LED 135 is optically coupled to a phototriac 141 which is connected to the noninverting input of a comparator 140 via a resistor 142. The comparator 140 provides a high logic level output on line 144 when switch 136 is not closed.

The output line 144 of comparator 140 is connected to the noninverting input of a comparator 148 which acts as an AND gate. Another input line 152 to the comparator 148 is normally high until a predetermined speed is reached by the engine as will be subsequently described. The comparator 148 provides a high logic level output on line 154 only when the input lines 146 and 152 are both at a high logic levels. When the line 154 is a high logic level, the ADVANCE signal is generated and the advanced timing characteristic output to the capacitive discharge circuits. When the output on line 154 is a low logic level, the NON-ADVANCED signal is generated and the non-advanced timing characteristic output to the discharge circuits.

It will be understood from the foregoing that the engine will be operated with the advanced timing characteristic until the engine warms up to an operating temperature of about 90° to 100°. When warm up switch 136 closes, the output 144 will be pulled to a low logic level thereby switching the comparator 148 to a low level and producing operation by the non-advanced ignition timing characteristic.

However, the engine will also operate in its advanced timing characteristic during start up and for a short predetermined period after initial start up, i.e., for approximately 5 to 10 seconds, regardless of the temperature of the engine. This is accomplished by having 3 the starter solenoid 155 apply the battery voltage B+ to a capacitor 160 via line 162, a diode 164 and a line 166 when the ignition switch is closed. Line 162 is connected to the noninverting input of the comparator 140 via a resistor 167. Upon starting of the engine, the battery voltage B+ will charge the capacitor 160 and provide a high logic level on the input line 138 to place the engine in the advanced timing characteristic mode of operation during the starting period of the engine and for the time period required to discharge the capacitor 160 to a level where the comparator 140 switches to a low output. In the illustrated embodiment, this is preferably about 7 seconds, although the circuit components can be chosen to provide a longer or shorter time period if desired.

In accordance with yet another aspect of the present control circuit 90, provision is made to automatically inhibit the advanced timing characteristic when the operating speed of the engine exceeds a predetermined level of approximately 1,500 RPM. This characteristic is to prevent operation of the engine with an ignition advance above this speed which could result in damage to the engine.

To inhibit the advanced timing characteristic, the voltage from converter 88 on output line 90 is connected to the inverting input 100 of a comparator 170 on line 100. The noninverting input of the comparator 170 is connected to the +5V reference supply line 116 via a resistor 174. The reference voltage is chosen to cause the comparator to have its output line 176 switched to a low logic level when the speed voltage increases to level equal to an operating speed of approximately 1,500 RPM. When the output line 176 is at a low logic level, it removes the high logic level applied to the comparator 148 thereby causing it to switch to a low logic level and disabling the ADVANCE signal to remove the engine from its advanced timing characteristic mode of operation. Thus, the circuitry always prohibits operation in an advanced timing mode above approximately 1,500 RPM, even if the engine is not warmed up or is still 3 within the start-up period of approximately 7 seconds after staring.

The power for operating the control circuit 90 is obtained from a voltage induced in the stator coil 71 that is regulated by the power circuitry. During the initial start-up period, the cranking speed may not be sufficient to provide reliable voltage levels to ensure correct circuit operation. Provision is made to supplement the output of the power supply with the battery voltage B+ from the starter solenoid during cranking. This is accomplished by coupling the battery voltage B+ on line 166 to line 74 via diode 164, line 162 and diode 180.

Figure 8:
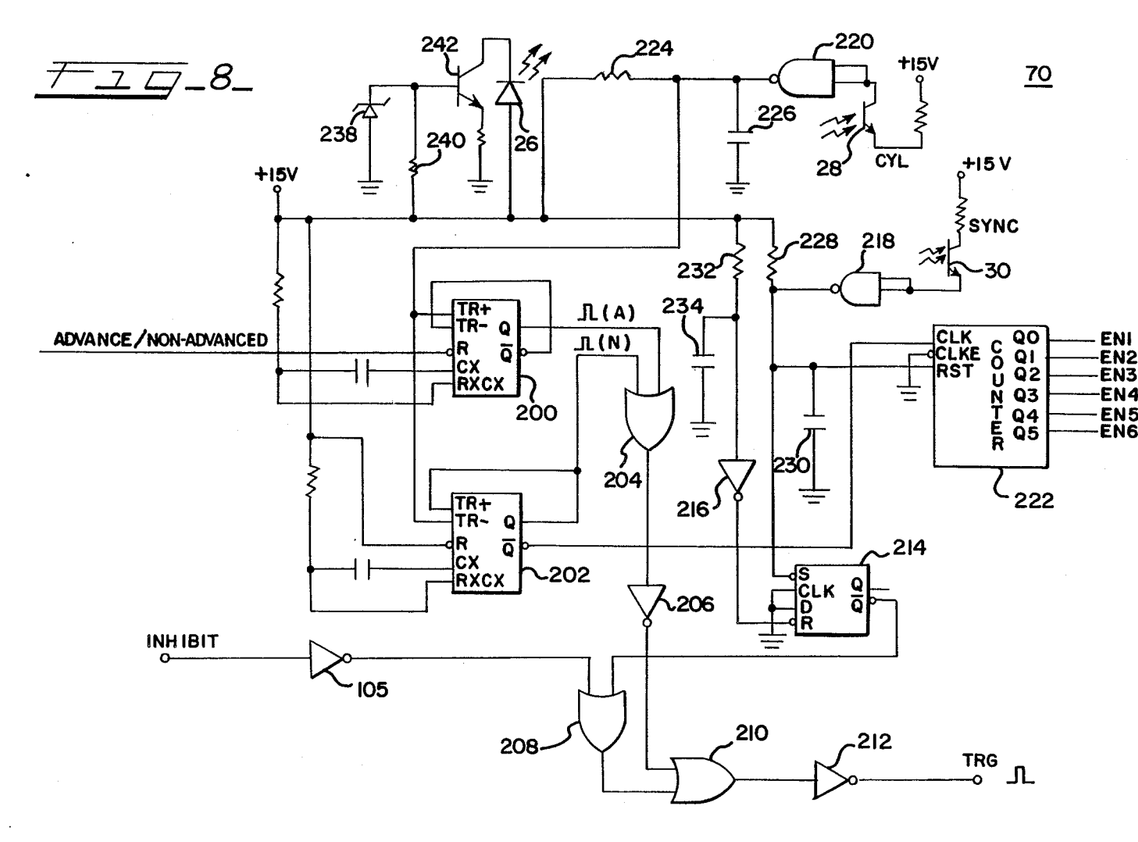
FIG. 8 is a detailed electrical schematic diagram of the pulse generator and distributor circuit illustrated in FIG. 5.

FIG. 8 illustrates the detailed electrical schematic of the pulse generator and distributor circuit 70. In general operation the pulse generator and distribution circuit 70 performs three functions. Initially, it generates the advanced pulse train A and the non-advanced pulse train N from the CYL waveform. Secondly, the circuit selects between the pulse train A and pulse train B, or inhibits both pulse trains, based on the input signals ADVANCE, NON-ADVANCED and INHIBIT. Additionally, the circuit generates the enabling signals, EN1-EN6 based on the SYNC waveform and the CYL waveform to distribute the selected pulse train as the TRG signal to the correct cylinders in the firing order of the engine.

The LED 26 is shown as being always powered on by its connection in a conductive path between +15V, the emitter-collector path of NPN transistor 242, a resistor, and ground. The transistor 242 regulates the current flow through LED 26 by having a predetermined bias voltage on its base. The bias voltage is generated by the combination of Zener diode 238 and resistor 240 connected between the + +15V supply and ground. Phototransistors 28 and 30 generate the previously described signals CYL and SYNC when illuminated by LED 26.

The pulse generator and distributor circuit 70 comprises basically two monostable multivibrators 200 and 202 and a synchronous sequential counter 222. Generally, the monostable multivibrator 200 is configured to be triggered by the positive going edge of a pulse to its TR+ input. Application of an edge transition from a low logic level to a high logic level at input TR+ will produce a positive going pulse from its Q output which becomes the advanced pulse train A. Conversely, the monostable multivibrator 202 is configured to produce a positive going pulse from its Q II output when a negative going edge of a pulse is applied to its TR— input, which results in normal pulse train N.

Both the TR+ input of monostable multivibrator 200 and the TR— input of monostable multivibrator 200 are connected to the output of a NAND of 200 are connected gate 220 which is configured as an invertor and driven by the CYL signal. The CYL signal is generated by the illumination of phototransistor 28 which is connected across both inputs of the NAND gate 220. The NAND gate 220 has an open collector output connected to the junction of a resistor 224 and a capacitor 226 which inverts the CYL signal, thus providing a positive going transition on the leading edge of the CYL signal and a negative going transition on the trailing edge of the CYL signal. The ADVANCE and NON-ADVANCED signals are combined into a single signal, ADVANCE/NON-ADVANCED, which is applied to the negative true reset terminal R of monostable 200. The ADVANCE signal is the high logic level of the combined signal while the NON-ADVANCED signal is the low logic level.

With this circuit, two pulses are generated for each CYL signal pulse and form two pulse train based on the leading edges of the CYL signal from monostable multivibrator 200 and one based on the trailing edges of the CYL signal from monostable 202. If the advanced pulses are selected, the ADVANCE/NON-ADVANCED is a high logic level and both pulse trains are transmitted to the cylinders. Because the ignition circuit is a capacitive discharge circuit, the non-advanced pulses which follow the advanced pulses do not perform a retriggering of the ignition system as the ignition capacitance has not yet recharged. If the non-advanced pulses are selected, the ADVANCE/NON-ADVANCED signal is a low logic level which holds monostable multivibrator 200 reset so that only the non-advanced normal pulse train is generated.

The first pulse train A and the second pulse train N are combined in an OR gate 204 before being inverted by inverter 206. The output of inverter 206 is fed through an OR gate 210 and finally inverted an inverter 212 before becoming the trigger signal TRG. The INHIBIT signal is provided through an inverter 105 and OR gate 208 to produce a disabling signal at OR gate 210 during its presence. When the INHIBIT signal is a low logic level, a high logic level disables OR gate 210 and both pulse trains.

Another inhibiting signal to OR gate 208 is provided by a D-type bistable 214 which has its *Q output connected to one of the inputs of the gate. The reset input R of bistable 214 is connected to the output of inverter 216 whose input is connected to a resistor-capacitor combination connected between +15V and ground. The set input S of the bistable 214 is connected to the SYNC signal at the output of NAND gate 218. In operation, the bistable 214 which is reset on power up normally disables the trigger pulses TRG until the first SYNC signal occurs. This is to prevent misfiring of the engine when initial engine rotation begins and the ignition system is not yet synchronous with the crankshaft. The capacitor 234 is generally charged up to +15V providing a normally low logic level on the reset input of the bistable 214. This produces a high logic level output from the *Q output and thus disables OR gate 210. When the first SYNC signal occurs, the bistable 214 is set removing the disabling signal from OR gates 208 and 210.

The counter 222 generates the enabling signals EN1-EN6 sequentially from its Q0-Q5 outputs, respectively. The enabling signals EN1-EN6 are generated in sequence and then cycled in the same sequence. The SYNC signal caused by the illumination of phototransistor 30 is used to apply a high logic level to the reset input RST of the counter 222. The SYNC signal is inverted by NAND gate 218, resistor 228 and capacitor 230 in the same manner the CYL signal was inverted. The SYNC signal causes the counter to reset and generate the EN1 signal thereby arming the respective capacitive discharge circuit associated therewith. The pulses A or N are then applied to the armed circuit firing the circuit in concert with its respective crankshaft position. After the trigger pulse has been applied, the clocks trailing edge of the *Q output of the monostable multivibrator 202 clocks the counter 222 by application of the *Q pulses to its CLK input. This advances the counter to the next enabling signal, EN2, and so on in the sequence until the cycle repeats.

Figure 9:
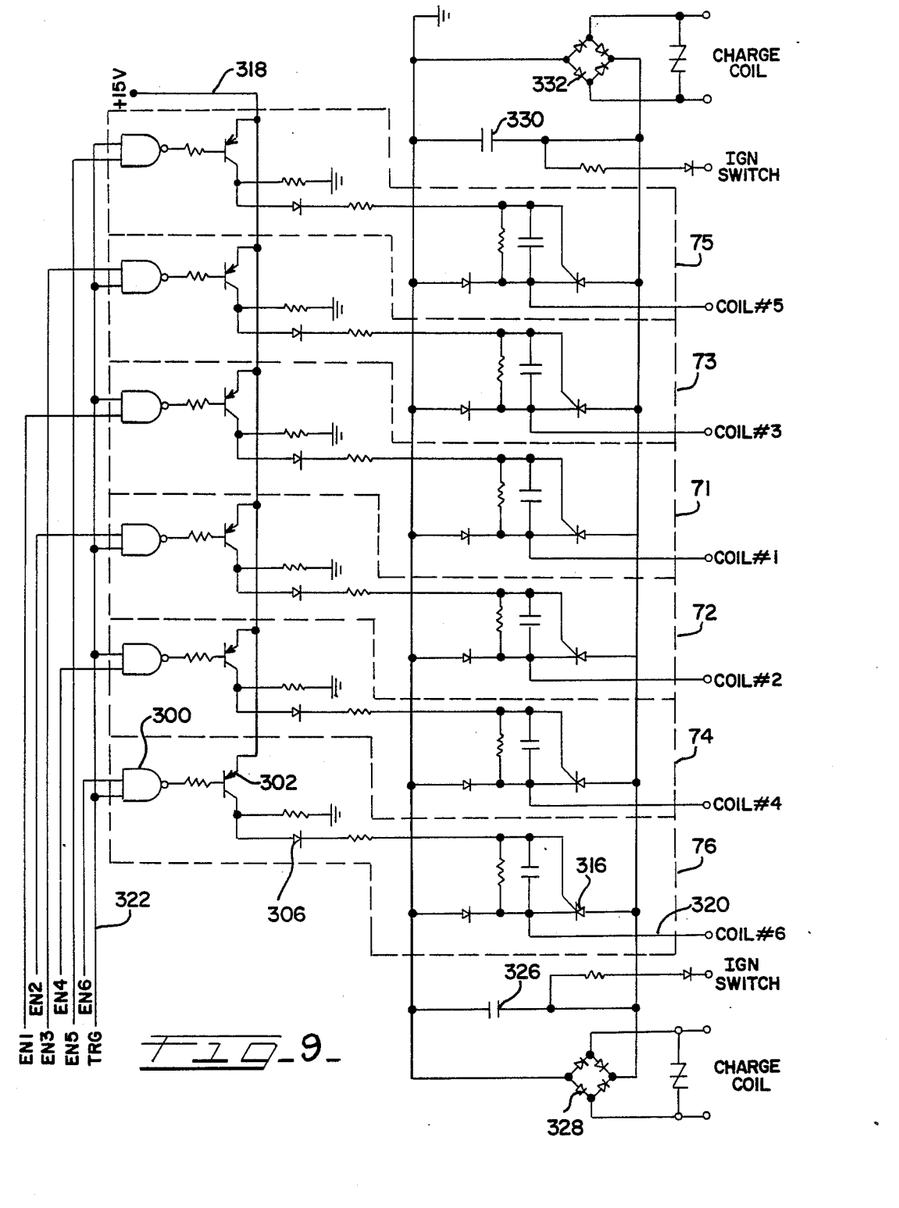
FIG. 9 is a detailed electrical schematic diagram of the capacitive discharge circuits illustrated in FIG. 5.

With reference to FIG. 9, the capacitive discharge circuits 71-76 operate identically with respect to each of the cylinders which may be present in the engine. In the disclosed embodiment, there are six cylinders and six discharge circuits, but only one of the circuits 76 for the cylinders will be described in detail for the purpose of clarity.

The six capacitive discharge circuits 71–76 are used to discharge alternate ignition capacitors 330 and 326 which are charged by the rectification of charge coil pulses. The charge coil pulses for one bank are rectified by diode bridge 328 for capacitor 326 and the charge coil pulses for the other bank are rectified by diode bridge 332 for capacitor 330.

When an ignition pulse TRG is passed through NAND gate 300 from line 322, it will enable PNP transistor 302 to pass a pulse from a voltage source on line 318 through diode 306. The voltage source on line 318 is the regulated voltage +15V from the power supply as previously described. NAND gate 300 is armed by the pulse generator and distributor 70 by the enable signal, EN6. The resulting pulse which is produced by the coincidence of the pulse signal TRG and the enabling level EN6 is directed to the gate terminal of an SCR 316 to turn it on. The SCR 316 when triggered into conduction, discharges one of the previously charged ignition capacitors 326 or 330 through a circuit path from its anode, cathode, and line 320 attached to the primary of the ignition coil for cylinder number 6.

To control the two timing schedules, the control circuit 90 either allows the advanced pulses and the non-advanced pulses to be applied to the NAND gates of circuits 71–76 or inhibits the advanced pulses so that only the non-advanced pulses are applied to the NAND gates. This is accomplished by holding the advanced monostable multivibrator 200 reset with a low logic level, the non-advanced signal. In addition, for particular engine conditions, both sets of pulses are inhibited. Thus, an ignition system has been shown which can provide an advanced schedule, a non-advanced schedule or an inhibition of both schedules based upon engine operating conditions.

While a preferred embodiment of the invention has been illustrated, it will be obvious to those skilled in the art that various modifications and changes may be made thereto is without departing from the spirit and scope of the invention as hereinafter defined in the appended claims.

What is claimed is:

1. An ignition system for an internal combustion engine of the type which has an ignition capacitor means, means for charging the ignition capacitor means, and means for discharging the ignition capacitor means in response to trigger pulses, the system comprising:

trigger pulse generating means for producing trigger pulses related to crankshaft position, said trigger pulse generating means being adapted to provide a non-advanced timing characteristic, and an advanced timing characteristic which is advanced a predetermined time with respect to said non-advanced timing characteristic;

said trigger pulse generating means including a time base generator comprising an encoder disk having a generally cylindrical encoding portion and an end support, said end support being connected to the crankshaft of the engine for rotating said encoder disk synchronously therewith, said encoding portion including timing sections of a predetermined width corresponding to a fixed crankshaft angle;

means for sensing the beginning of each timing section and producing a trigger pulse indicative thereof to generate said advanced timing characteristic; and means for sensing the ending of each timing section and producing a trigger pulse indicative thereof to generate said non-advanced timing characteristic;

whereby the width of said timing sections correspond to the degree of advance of said advanced timing characteristic over said non-advanced timing characteristic;

means for generating either an advanced signal for the selection of said advanced timing characteristic or a non-advanced signal for the selection of said non-advanced timing characteristic based upon at least one operating condition of the engine;

said trigger pulse generating means providing trigger pulses with said advanced timing characteristic in response to said advance signal being applied thereto and providing trigger pulses with said non-advanced timing characteristic in response to said non-advanced signal being applied thereto.

2. An ignition system as set forth in claim 1 wherein said timing sections are slots and said sensing means include:

emitting means for emitting radiation positioned on one side of said encoding portion and detecting means for detecting emitted radiation positioned on the other side of said encoding portion, said detecting means generating one logic level when detecting said emitted radiation and generating another logic level when not detecting said emitted radiation.

3. An ignition system as set forth in claim 1 wherein said sensing means further include:

a first monostable multivibrator triggered by the leading edge of said cylinder signal to output pulses with said advanced timing characteristic; and a second monostable multivibrator triggered by the trailing edge of said cylinder signal to output pulses with said non-advanced timing characteristic.

4. An ignition system as defined in claim 3 wherein:

said advance signal enables said first monostable multivibrator; and said non-advanced signal disables said first monostable multivibrator.

5. An ignition system as defined in claim 3 wherein:

said advance signal disables said second monostable multivibrator; and said non-advanced signal enables said second monostable multivibrator.

6. An ignition system for an internal combustion engine having multiple cylinders driving a crankshaft, each cylinder having at least one spark plug to ignite an air/fuel mixture therein, said ignition system comprising:

a plurality of cylinder discharge means, each corresponding to one of the cylinders and including ignition capacitor means, means for charging said ignition capacitor means, means for discharging said ignition capacitor means in response to trigger pulses, and step-up transformer means for generating a high tension voltage pulse to the spark plug of the cylinder in response to the discharge of said ignition capacitor means;

means for alternatively generating either an advance signal for the selection of said first pulse train or a non-advanced signal for the selection of said second pulse train based upon at least one operating parameter of the engine;

a time base generator including an encoder disk which rotates synchronously with the crankshaft of the engine and includes a plurality of timing sections of a predetermined width which are at fixed locations relative to the crankshaft and at least one synchronizing section which is at a fixed location relative to crankshaft position and to at least one of said timing sections;

detector means for detecting the presence or absence of said timing sections and said at least one synchronizing section and for generating digital signals representative thereof;

trigger pulse generating means for generating a first pulse train from the trailing edge of each timing section represented in said digital signal and for generating a second pulse train from the leading edge of each timing section represented in said digital signal whereby the pulses of said second pulse train are advanced from the pulses of said first pulse train by a predetermined angular rotation of the crankshaft as determined by the width of each timing section;

said trigger pulse generating means providing said second pulse train to said cylinder discharge means in response to said advance signal being applied thereto and providing said first pulse train to said cylinder discharge means in response to said non-advanced signal being applied thereto; and means for generating sequential enabling signals in the firing order of the engine based upon said synchronizing section, each of said enabling signals being applied to corresponding cylinder discharge circuits to discharge said respective ignition capacitor on the coincidence of a respective said enabling signal and a trigger pulse.

7. An ignition system as defined in claim 6 wherein said means for generating said advance signal or non-advanced signal includes:
means for generating said advance signal during engine start up.

8. An ignition system as defined in claim 7 wherein said means for generating said advanced signal or said non-advanced signal further includes:
means for generating said advance signal for a first predetermined period of time after engine start up.

9. An ignition system as defined in claim 8 wherein said means for generating said advance signal or said non-advanced signal further includes:
means for generating said advance signal until the engine temperature exceeds a first predetermined level.

10. An ignition system as defined in claim 9 wherein said means for generating said advance signal or non-advanced signal includes:
means for generating said non-advanced signal if the speed of the engine exceeds a first predetermined level, regardless of said first period and first temperature.

11. An ignition system as defined in claim 10 which further includes:
means for disabling said trigger pulse generating means when the engine is operating above a third predetermined speed which is greater than said first speed.

12. An ignition system as defined in claim 11 which further includes:
means for disabling said trigger pulses when the engine is operating above a second predetermined speed and above a second predetermined temperature; and
wherein said second temperature is greater than said first temperature and said second speed is greater than said first speed, but less than said first speed.

13. An ignition system as defined in claim 12 which further includes:
means for delaying the disablement of said trigger pulse generating means at said second speed for a predetermined period of time after the engine reaches said second predetermined temperature.

14. An ignition system as defined in claim 13 wherein said means for delaying includes:
means for providing said third speed as a high threshold;
means for providing said second speed as a low threshold; and
moving said high threshold to said low threshold as a function of time after said engine reaches said second predetermined temperature.

15. An ignition system as defined in claim 6 wherein:
said timing sections are all of the same width.

16. An ignition system as defined in claim 6 wherein:
said timing sections are not all of the same width.

17. An ignition system as defined in claim 6 wherein the internal combustion engine is a two-cycle engine and wherein:
each timing section corresponds to one cylinder of the engine.

18. An ignition system as defined in claim 6 wherein the internal combustion engine is a four-cycle engine and wherein:
each timing section corresponds to two cylinders of the engine.

19. An ignition system as defined in claim 17 wherein:
said synchronizing section indicates a predetermined point in the firing order of the engine.

20. An ignition system as defined in claim 18 wherein:
every other of said synchronizing sections indicates a predetermined point in the firing order of the engine.

21. An ignition system as defined in claim 6 which further includes:
means for mounting said detector means and for allowing movement of said detector means relative to the crankshaft and said fixed positions of said timing sections.

22. An ignition system as defined in claim 21 wherein said means for mounting include:
a mounting ring concentric to the crankshaft which is adapted to rotate about the crankshaft to vary the position of the detector means relative thereto.

23. An ignition system as defined in claim 22 wherein said means for mounting further include:
means for rotating said mounting ring dependently upon at least one operating parameter of the engine.

24. An ignition system as defined in claim 23 wherein:
said at least one operating parameter of the engine is the detected throttle position.

25. An ignition system as defined in claim 6 wherein:
said encoder disk is substantially cylindrical in shape and includes a timing portion having said timing sections implemented as timing slots about its periphery.

26. An ignition system as defined in claim 25 wherein:

said detector means includes a first emitter and first receiver of optical radiation coupled through an optical path and located such that said timing sections make or break said optical path as said encoder disk rotates.

27. An ignition system as defined in claim 26 wherein said detector means further includes:
a second emitter and second receiver of optical radiation coupled through an optical path and located such that said at least one synchronizing section makes and breaks said optical path as said encoder disk rotates.

* * * * *